W. MARSHA.
STRAINER.
APPLICATION FILED MAR. 6, 1916.
1,196,570.
Patented Aug. 29, 1916.
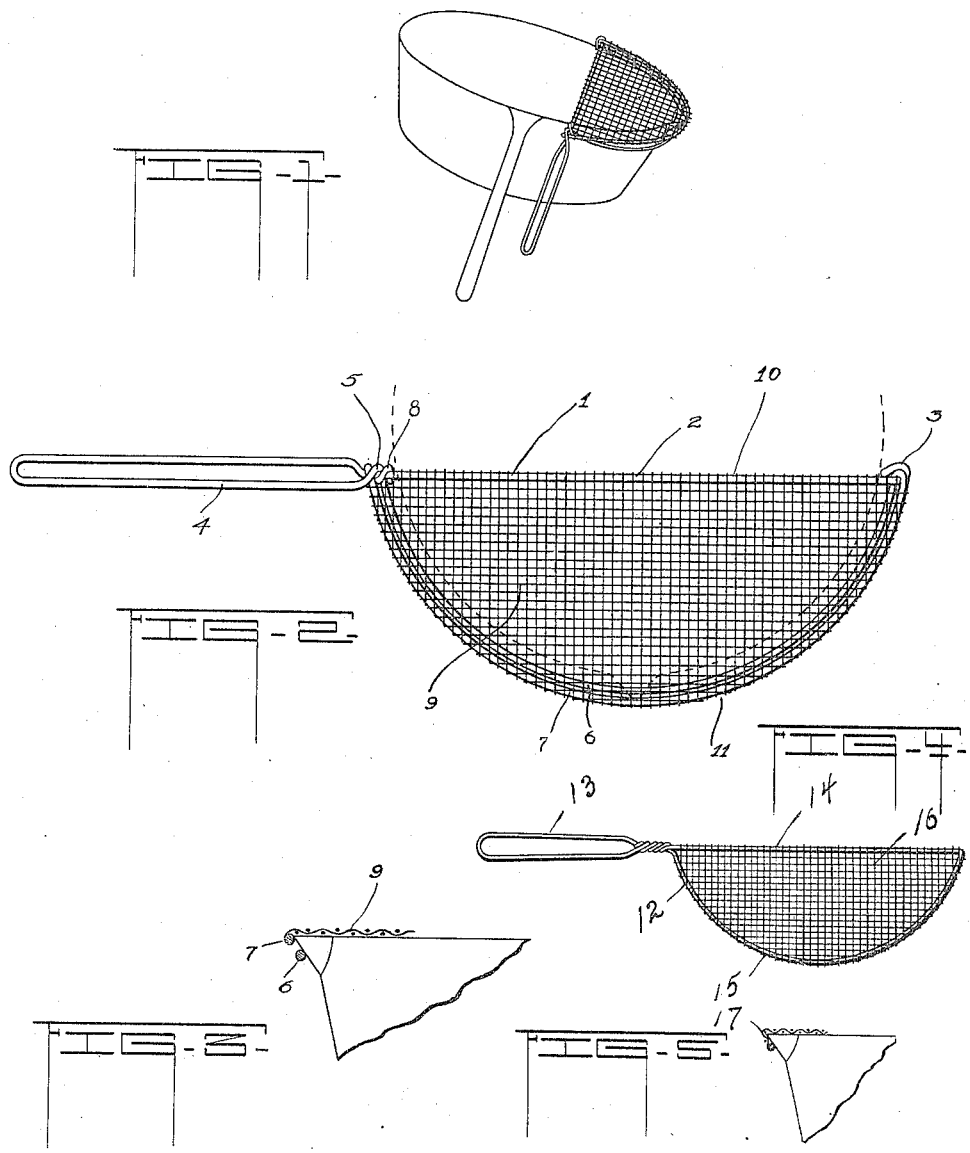
INVENTOR
Will Marsha,
By La Porte, Bean & Graham.
Att'ys.

UNITED STATES PATENT OFFICE.

WILL MARSHA, OF DECATUR, ILLINOIS, ASSIGNOR OF ONE-HALF TO JEREMIAH BLACK, OF DECATUR, ILLINOIS.

STRAINER.

1,196,570.   Specification of Letters Patent.   Patented Aug. 29, 1916.

Application filed March 6, 1916. Serial No. 82,323.

*To all whom it may concern:*

Be it known that I, WILL MARSHA, a resident of Decatur, county of Macon, and State of Illinois, have invented certain new and useful Improvements in Strainers, of which the following is a specification.

My invention relates to improvements in straining devices and the principal object is the provision of such a device which may be conveniently and readily manipulated.

A further object of this invention is the provision of a device which may be readily held in position to strain and clean foods of various kinds and other materials in utensils or receptacles of various sizes and shapes.

To the accomplishment of the foregoing and such other objects as may hereinafter appear, my invention consists in the construction, combination and arrangement of parts hereinafter described and then sought to be defined in the appended claims, reference being had to the accompanying drawing forming a part hereof and which shows merely for the purpose of illustrative disclosure, a preferred embodiment of my invention, it being understood that various changes may be made in practice within the scope of the claims without digressing from my inventive idea.

Figure 1 represents a perspective view of the device constructed according to my invention indicated to use on a pan; Fig. 2 is a top plan view of the same; Fig. 3 is a detail section showing the relative position of the straining means and the engaging and holding member. Fig. 4 is a plan view of a modified form of my invention. Fig. 5 is a detail section showing the manner of positioning the same over the spout of the utensil.

Broadly described, this device comprises a wire frame member which is bent to provide a looped handle portion and a looped strainer portion having a straining means secured thereto and also having a holding and positioning member substantially paralleling one edge of the straining portion whereby the device is readily positioned and held in position against the edge of the utensil or receptacle in use.

Referring now to the drawings, the numeral 1 designates the wire member, which is integral as shown and which comprises the substantially straight portion 2 having the hook or eye 3 at one end. At the other end this wire member is looped to form the handle portion 4, after which it is carried over the straight portion 2 at 5. From thence it extends in the form of an arc of a circle 6 and passes through the hook or eye 3, returning substantially parallel to the loop 6 in the second loop 7, the end being wrapped around the straight portion 2 and the bent portion 5 as indicated at 8, whereby the parts are locked together. The second loop portion 7 is covered with a suitable straining means 9 shown in the form of a netting, but it is to be understood that this may be made of any suitable material and may vary in the size of mesh and openings according to the use to which it is to be put.

It is to be noted that the straining means is provided with the straight edge portion 10 and with the curved edge portion 11, paralleling which edge portion is the holding and positioning means formed by the loop 6.

Of course it is understood that the size and proportion of the parts may be varied to suit different conditions and that one device may be used with a number of articles of different sizes and shapes.

In use, it is only necessary to grasp the device and hold it so that the holding and positioning means 6 engages the edge of the utensil or receptacle and holding the straining means on top of the utensil or receptacle so that as the latter is tilted for the purpose of emptying or draining, the contents will be strained through the straining means. No means of attachment to the utensil or receptacle is necessary as the device is conveniently and securely held in position during operation due to the holding and positioning means 6 engaging the edge portion of the utensil or receptacle.

The uses of this device are numerous, it being adapted to strain vegetables, fruits and similar articles and to clean the same and for various other household culinary and domestic purposes.

I show a slightly modified form of my invention in Figs. 4 and 5. It comprises the frame member 12 which is looped as at 13 to provide the handle which has the straight portion 14 forming the upper edge of the straining portion and which has the larger looped portion 15 forming the curved edge of the straining portion. The straining means 16 is secured thereon and is bent as at 17 so that it will engage over the top edge of a utensil or receptacle and so that the curved wire member 15 forms the holding and positioning member for holding the same in proper position on the utensil or receptacle.

What I claim is:

1. A device of the character described including in combination, a wire frame having a handle portion and a straining portion with straining means secured thereon, said wire frame also including an engaging member substantially paralleling the edge of the straining portion so as to properly position the device when straining.

2. A device of the character described including in combination, a wire frame having a handle portion and a straining portion having a circular edge and straining means secured on said straining portion, said wire frame also having an engaging member substantially paralleling and spaced from the circular edge of the straining portion so as to properly position the device when straining.

3. A device of the character described, including in combination, a wire frame member formed so as to provide a handle portion, a semi-circular portion having straining means secured thereto and an engaging member paralleling the circular edge of the straining member so as to hold the device in position against the edge of a utensil or receptacle.

4. A device of the character described including in combination, an integral wire frame member having a substantially straight portion with a looped portion at one end forming a handle and with a pair of loops at the other end portion, straining means secured to one of the loops, the other loop forming a holding and positioning member to hold the device in position on the edge of a utensil or receptacle.

5. A device of the character described, including in combination, an integral wire frame member formed to provide a substantially straight portion with an eye at one end and looped to provide a handle at the other end and having a pair of loops formed by the wire passing through the eye and secured at the end of the handle portion, straining means secured to one of the looped portions, the other looped portion serving as an engaging and holding member to position and hold the device against the edge of a receptacle or utensil.

WILL MARSHA.

Copies of this patent may be obtained for five cents each, by addressing the "Commissioner of Patents, Washington, D. C."